United States Patent [19]

Flowers

[11] Patent Number: 4,909,525
[45] Date of Patent: Mar. 20, 1990

[54] CONVERTIBLE PERSONAL VEHICLE HAVING A TAKE-APART FRAME

[76] Inventor: Michael Flowers, 934 Doncaster Dr., West Deptford, N.J. 08066

[21] Appl. No.: 296,806

[22] Filed: Jan. 13, 1989

[51] Int. Cl.⁴ .................... B62D 21/12; B62K 11/04; B62K 13/08

[52] U.S. Cl. ...................... 280/30; 280/785; 180/210; 180/216; 180/908

[58] Field of Search ............... 280/798, 796, 785, 30; 180/908, 210, 216; 296/196, 197, 29

[56] References Cited

U.S. PATENT DOCUMENTS

| | | | |
|---|---|---|---|
| 3,799,283 | 3/1974 | Freber | 280/796 X |
| 4,356,876 | 11/1982 | Watanabe et al. | 180/210 |
| 4,570,739 | 2/1986 | Kramer | 180/216 |
| 4,708,219 | 11/1987 | Cresswell | 180/210 X |

Primary Examiner—Charles A. Marmor
Assistant Examiner—Tamara L. Finlay
Attorney, Agent, or Firm—Edmund M. Jaskiewicz

[57] ABSTRACT

A personal mobility vehicle comprises front and rear frame sections which can be disassembled and assembled. The frame sections are secured together by a pivotable detachable connection such that the rear frame section is lockingly received in the rear portion of the front frame section and the length of the assembled frame is substantially the same as the length of the front frame section itself. An auxiliary frame section is also provided which can be readily attached to the powered rear frame section to provide improved mobility in those situations in which space for turning is limited.

23 Claims, 4 Drawing Sheets

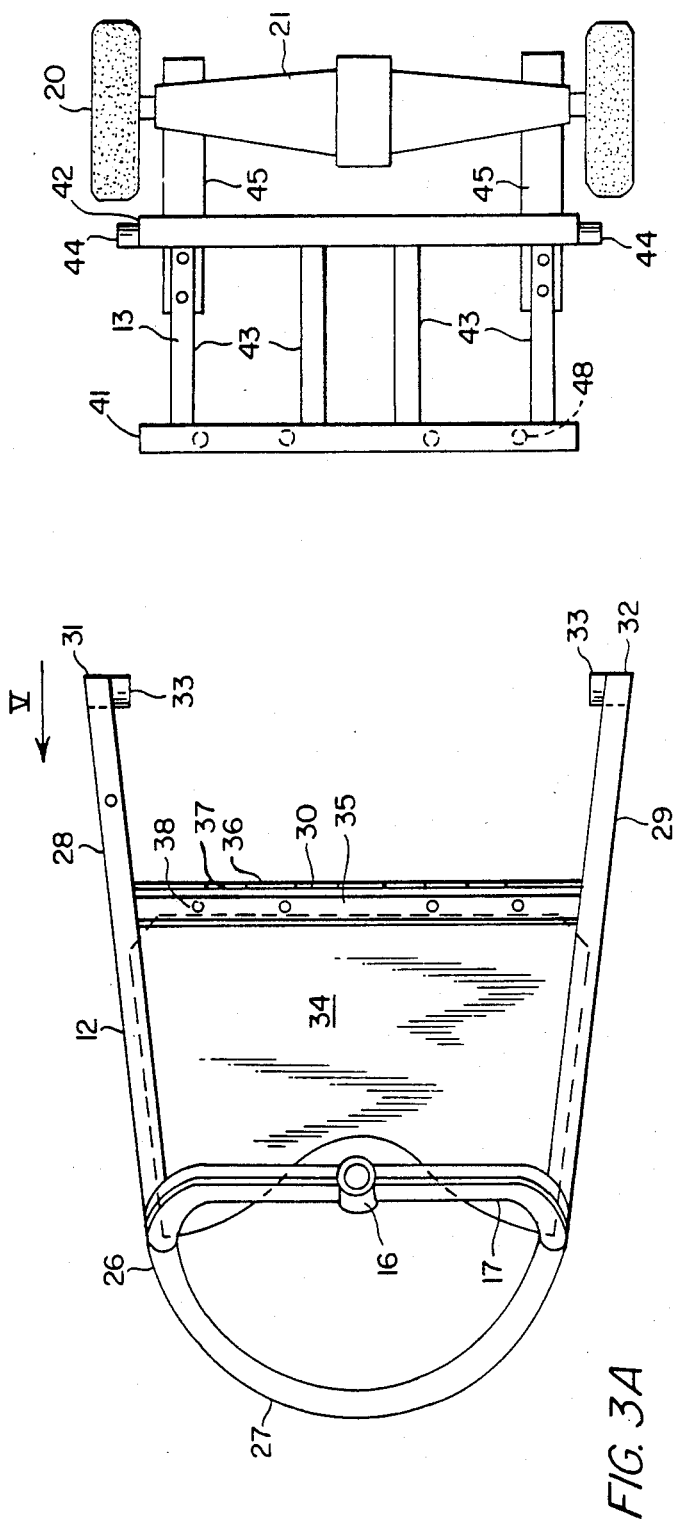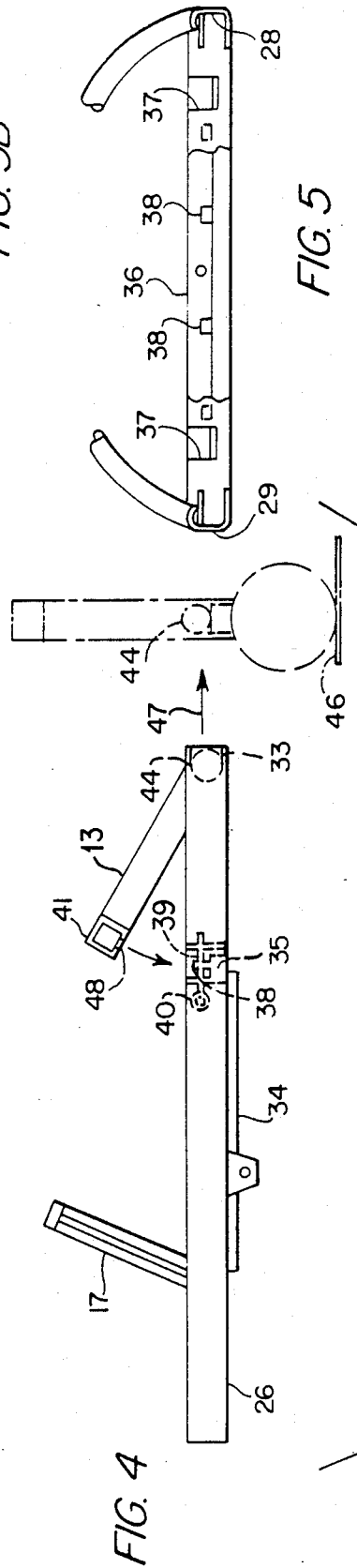

CONVERTIBLE PERSONAL VEHICLE HAVING A TAKE-APART FRAME

The present invention relates to self-propelled personal vehicles intended for persons who have some physical disability and which have a separable power unit and a control unit, more particularly, to an auxiliary unit which can be connected to the power unit in place of the control unit to improve the maneuverability of the vehicle without adversely affecting it's stability.

In order to provide persons with partial or total walking disabilities with an increased range and greater flexibility in locomotion, small personal mobility vehicles have been developed. One form of such vehicle generally has a pair of rear wheels which are powered by an electric storage battery, a steerable front wheel and a seat unit which is positioned at different locations with respect to the front and rear wheels. These components are generally mounted on some form of a frame or platform. Such a personal mobility vehicle is generally much too heavy in weight and bulky to be manipulated by the user in loading the vehicle into an automobile for transport or to move the vehicle up a flight of stairs. Some additional assistance such as an attendant or powered lift platform is thus necessary to load the personal mobility vehicle into a van or the like.

Personal vehicles having three wheels, i.e. two rear drive wheels and a steerable front wheel, are generally preferred by handicapped persons since these vehicles have the appearance of a down-sized golf cart. Thus, a certain degree of social stigma associated with wheelchairs is avoided when handicapped persons use such three wheel vehicles. However, these three wheel vehicles are largely intended for outdoor use and they have a wheel base of sufficient length that the feet of the seated occupant are positioned rearwardly of or next to the front wheel.

While this relationship provides proper stability when driving over uneven terrain outdoors, such vehicles are difficult to use indoors since their rather long wheel base makes travel between rooms of a house difficult. Indoor use is almost impossible in those houses which have a hallway from which a vehicle user must make sharp turns in limited space to go into particular rooms such as a bathroom and bedroom. Thus, the overall length and limited maneuverability of such three wheel vehicles may actually limit the mobility of the user when indoors.

It has therefore been proposed to construct such vehicles so that they may be disassembled into several components to facilitate the transfer of such vehicles in an automobile or van or to in some other manner transfer the site of operation of the personal mobility vehicle. It was further contemplated that such personal vehicles would be capable of disassembly and assembly by patients and others who have some physical disability but are sufficiently physically active to assemble or disassemble the components of a personal vehicle. However, in many cases the disassembled components of the personal vehicle were still rather heavy and bulky for a single person, let alone a patient with some disability, to readily handle in order to place the components into an automobile trunk, for example. In order to insure that the connection and latch systems between the components of the personal vehicle were safe and rigid, these systems became rather complex and complicated to handle. When attempts were made to simplify these systems, the resulting systems were not completely reliable.

Further, while the assembly and disassembly of such vehicles facilitates transfer of the vehicle to different locations, the assembled vehicle in most cases lacks the degree of compactness and maneuverability necessary for indoor use, such as movement from one room to another.

Personal mobility vehicles which can be disassembled into several components and subsequently reassembled are disclosed in U.S. Pat. Nos. 4,757,868; 4,452,327; 4,570,739; 3,912,032 and 4,750,578. However, all of these prior art vehicles have relatively complicated connecting and latching arrangements and none of these vehicles disclose auxiliary wheels which might be temporarily attached to a powered component of a personal mobility vehicle for unrestricted use indoors.

It is therefore the principal object of the present invention to provide a novel and improved personal mobility vehicle which can be readily converted into a more compact and maneuverable vehicle for indoor use.

It is another object of the present invention to provide a novel and improved frame for a personal mobility vehicle having two frame sections which can be readily disassembled and assembled.

It is a further object of the present invention to provide a novel and improved detachable connection between several frame sections which enables the frame sections to be readily assembled or disassembled with a minimum of physical effort and without special tools.

It is an additional object of the present invention to provide a personal mobility vehicle having a powered component to which auxiliary steerable wheels and a tiller can be attached to significantly shorten the wheel base to increase the maneuverability of the vehicle without adversely affecting it's stability.

According to one aspect of the present invention, a personal mobility vehicle may comprise a front frame section having a steering column operatively connected to a steerable front wheel mounted on the forward portion thereof. A rear frame section has a motor drivingly connected to drive wheels and further includes a battery to operate the motor and a seat unit. Means are provided on the rear portion of the front frame section and on the rear frame section for detachably connecting the rear frame section within the rear portion of the front frame section such that the length of the connected front and rear frame sections is the same as the length of the front frame section.

In place of the front frame section, an auxiliary frame section having at least one steerable wheel can be connected to the rear frame section to decrease the length of the wheel base to provide mobility in confined areas.

A detachable connection between the front and rear frame sections may comprise a pair of pivot cups on the rear end of the front frame section to longitudinally receive transversely extending pivot pins on the rear end of the rear frame section. The rear frame section can be then pivoted into the plane of the front frame section and detachably locked in position.

Other objects and advantages of the present invention will be apparent upon reference to the accompanying description when taken in conjunction with the following drawings, which are exemplary, wherein;

FIG. 3A is a top plan view of the front frame section of the vehicle of FIG. 1;

FIG. 3B is a top plan view of the rear frame section of the vehicle in FIG. 1;

FIG. 4 is a side elevational view showing the front and rear frame sections of FIGS. 3A and 3B assembled and the rear frame section in position to be pivoted into locking relation in the front frame section;

FIG. 5 is an end elevational view viewed in the direction of the arrow V of the front frame section of FIG. 3A with a portion of the head tube support being removed;

Proceeding next to the drawings wherein like reference symbols indicate the same parts throughout the various views a specific embodiment and modification of the present invention will be described in detail.

Figure 1:
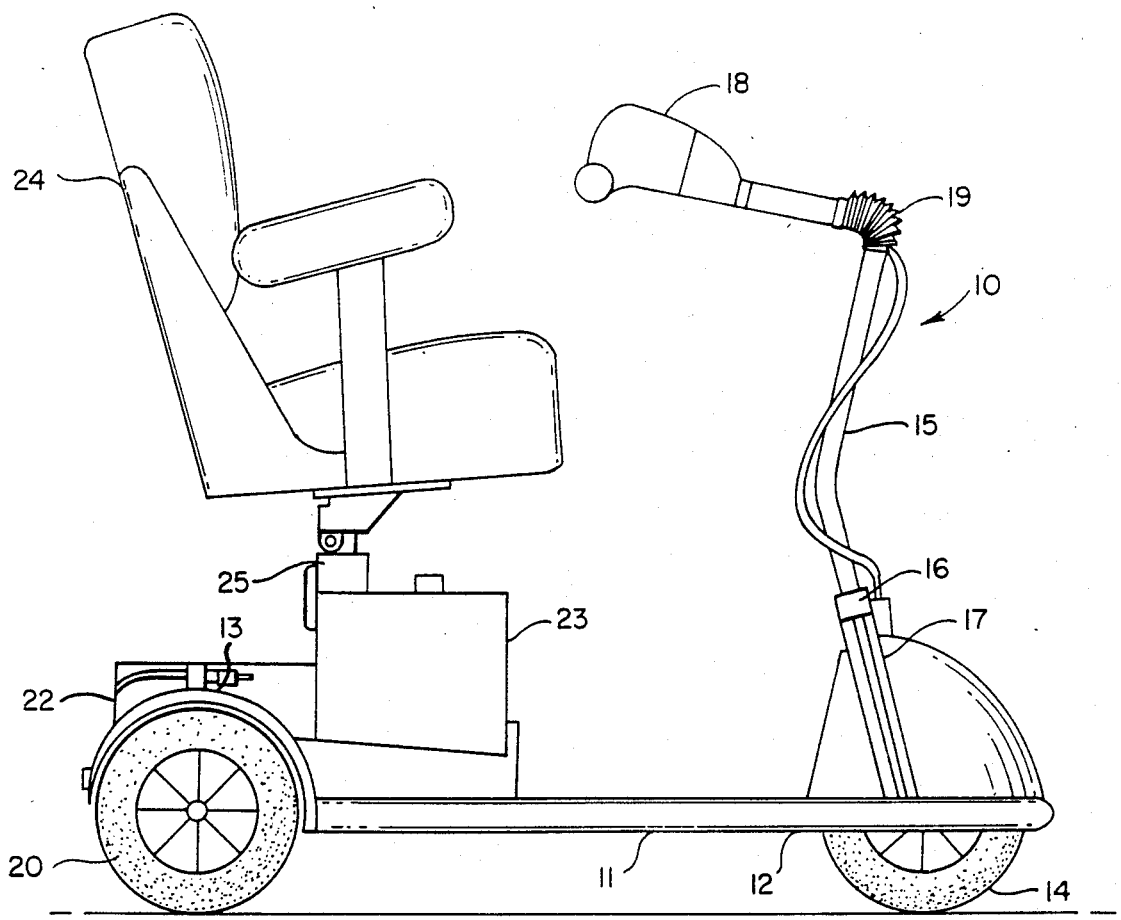
FIG. 1 is a side elevational view of a three wheel personal vehicle which incorporates the present invention.

As may be seen in FIG. 1, a personal vehicle incorporating the present invention is indicated generally at 10. This vehicle comprises a light weight aluminum frame 11 which consists of a front frame section 12 and a rear frame section 13 illustrated in greater detail in FIGS. 3A and 3B, respectively. The front frame section 12 comprises a front wheel 14 which is steerable by means of a handlebar 15 which is pivotally mounted in a head tube 16 mounted on a head tube support 17. The upper end of the handlebar 15 has a control unit 18 which may comprise a volt meter/fuel gauge, on-off key switch and dial-a-speed adjustment knob. The handlebar 15 also has an adjustable joint 19 which enables the control head 18 to be adjusted to a desired height.

Figure 8:
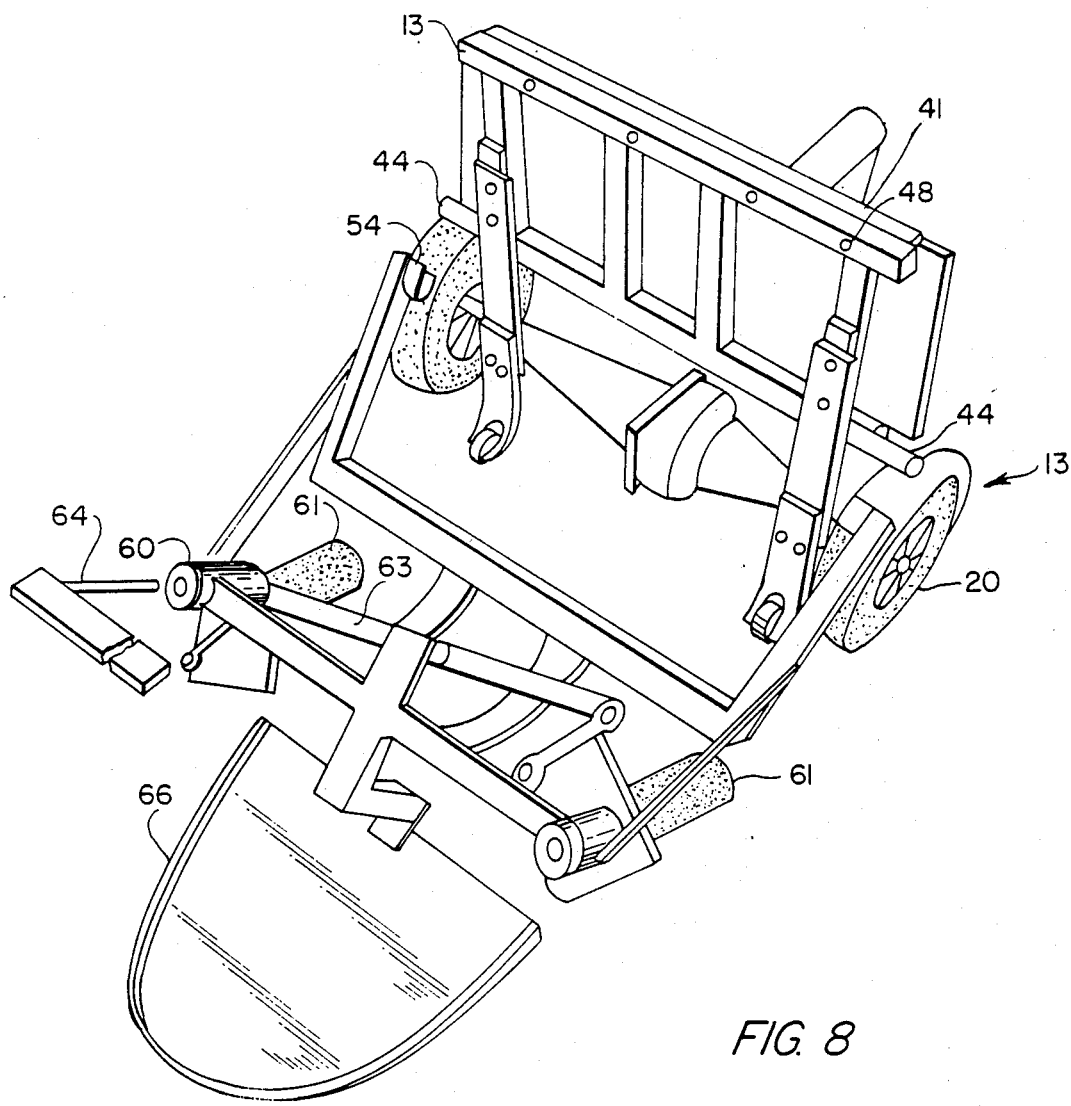
FIG. 8 is a perspective view of the auxiliary and rear frame sections of FIGS. 6A and 6B in a position for assembly.

The rear frame section 13 which is shown in greater detail in FIGS. 3B and 8, comprises drive wheels 20 mounted on the end of a sealed direct drive transaxle 21 which is drivingly connected to an electric motor 22 powered by batteries 23. A pivotable seat unit 24 is mounted in a socket 25 which is upstanding from the rear frame section 13. Preferably, the rear frame section also includes a built-in battery charger which is not illustrated.

Figure 2:
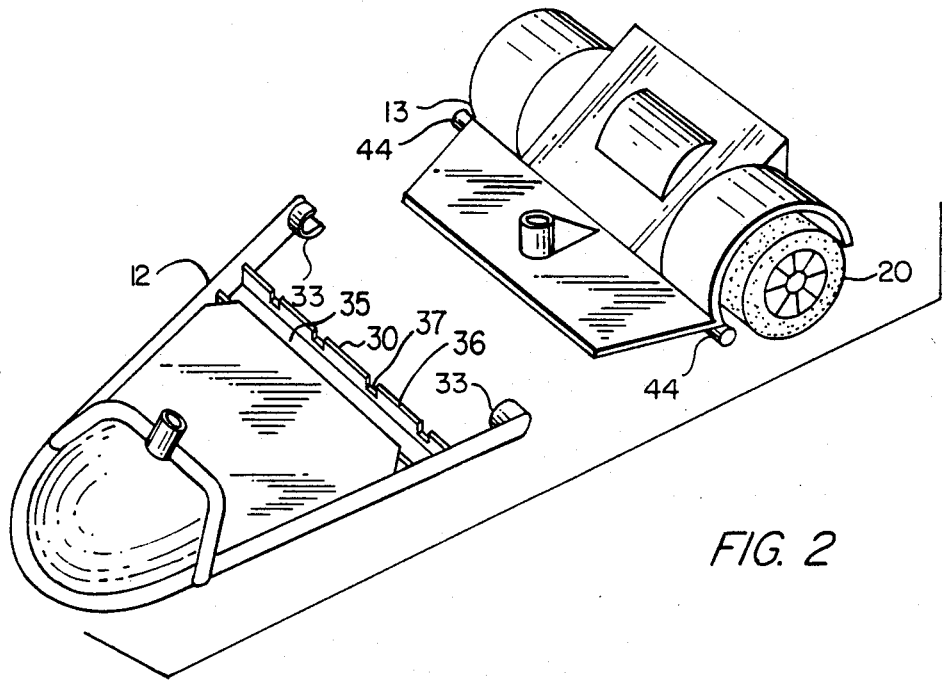
FIG. 2 is a perspective view showing the front and rear frame sections of FIG. 1 disassembled and the seat unit and steering handle removed for purposes of clarity.

The personal vehicle 10 can be disassembled into two major components comprising the front frame section 12 and the rear frame section 13 as shown in FIG. 2. The handlebar can be further removed from the front frame section and the seat unit and batteries can be disassembled from the rear frame section so that these frame sections would then appear as shown in FIG. 2. The disassembly of the vehicle is achieved by the frame construction which will now be described in detail.

The front frame section 12 comprises a U-shaped frame loop 26 with the closed end of the frame loop defining the front 27 and the frame loop having a pair of slightly diverging longitudinal members 28 and 29. A cross member 30 connects the longitudinal members 28 and 29 inwardly of the ends thereof to define a rear portion of the front frame section. The longitudinal members 28 and 29 have ends 31 and 32 respectively and secured on the ends are transversely extending pivot cups 33 which are substantially U-shaped and which open longitudinally and toward the rear of the front frame section. The frame loop 26 is preferably formed from a substantially rectangular cross section hollow aluminum tubular member. The central portion of the front frame section extending approximately between the cross member 30 and the head tube support 17 is covered by a floor pan 34 attached to the underside of the frame loop as seen in FIG. 4.

The cross member 30 is formed from a channel member which opens upwardly and has a web 35 and a flange 36 directed toward the rear of the front frame section. The flange 36 has a plurality of spaced rectangular notches 37 therein to accommodate respectively the center support members on the rear frame section in a manner to be presently described.

The web 35 of the cross member 30 has on its inner surface a plurality of upwardly extending cylindrical protuberances 38. There is a pair of opposed openings in the central portion of the flange to accommodate a locking pin 39 having a pull loop 40. The locking pin 39 is preferably of the type which has a spring biased depressable detent so as to prevent the pin from disengaging itself from the openings.

The rear frame section 13 shown in FIG. 3B comprises front and rear cross members 41 and 42 which are interconnected by a plurality of center support members 43. These members are all preferably formed of square sectioned aluminum tubing. A pair of oppositely disposed pivot pins 44 extend transversely from the ends of the rear cross member 42. These pivot pins are cylindrical and shaped to fit pivotably into the pivot cups 33.

The power axle 21 and rear wheels 20 are mounted rearwarddly of the rear cross member 42 by a pair of flat leaf springs 45 whose inner ends are secured to the undersides of the outer central cross members 43 as shown.

The disassembled vehicle can be readily assembled in a matter of seconds without tools. The rear frame section 13 is stood up on its rear structure which may comprise a collapsable back basket 46 into the position as illustrated in phantom lines in FIG. 4 and in the position as shown in FIG. 8. The front frame section is then moved longitudinally in the direction of the arrow 47 until the transversely extending pins 44 are received into the pivot cups 33. This positioning of the transverse pins into the pivot cups will align the front and rear frame sections in the correct position. The rear frame section is then pivoted downwardly in a counter clockwise direction as seen in FIG. 4 until the front cross member 41 is seated within the channel member 30. In this seated position, the central support members 43 of the rear frame section 13 will be received within the notches 37 in the channel member 30 and the protrusions 38 in the channel member 30 will be received into correspondingly positioned openings 48 formed in the underside of the front cross member 41 of the rear frame section. The locking pin 39 is then passed through corresponding openings in the front cross member 41 and in the flange of the channel member 30 to lock the frame sections securely in their proper positions. The seat unit and batteries are then replaced on the rear frame section and the handlebar on the front frame section and the vehicle is ready for operation. The above described connection between the front and rear frame sections provides a secure and rigid assembled frame which will withstand shocks and impacts, such as being driven off a curb or other high level. Since the rear frame section is detachably connected within the rear portion of the front frame section it becomes an integral part of the front frame section to form the entire assembled frame of the vehicle. The assembled vehicle thus provides limitless mobility over even the roughest terrain.

Figure 6B:
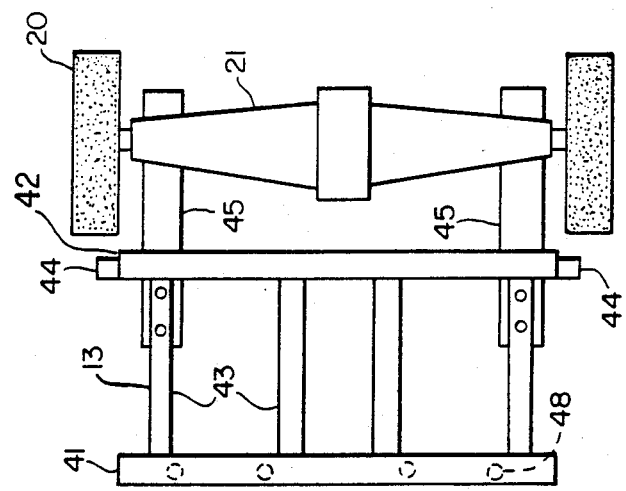
FIG. 6B is a view similar to that of FIG. 3B.
Figure 6A:
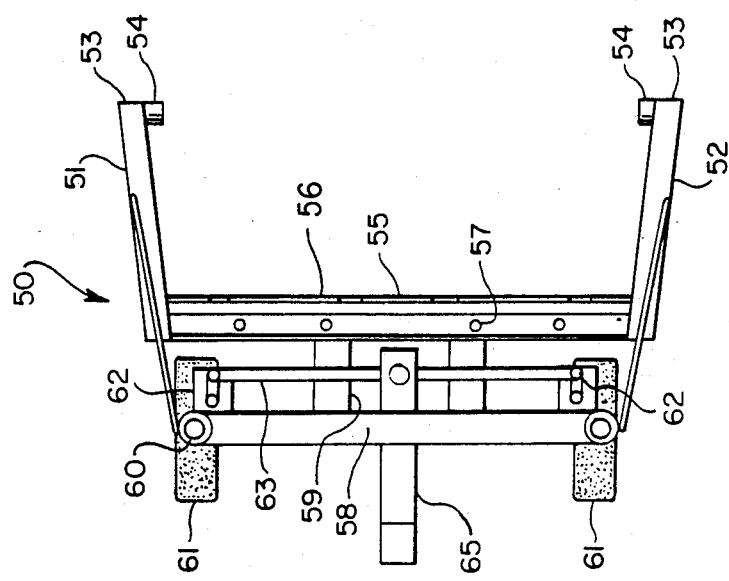
FIG. 6A is a view similar to that of FIG. 3A but of an auxiliary frame section.

Under certain circumstances, the user of the personal vehicle may desire to have the mobility provided by a powered vehicle but may find it impossible to use the vehicle in an indoor location, such as a private home or a hotel room. Under these circumstances, the user has the option of converting the vehicle into a more compact and shorter vehicle by attaching a shorter auxiliary frame section having two steerable front wheels and a tiller to the rear frame section. Such an auxiliary frame section significantly decreases the wheel base of the vehicle and is indicated generally at 50 and illustrated in FIGS. 6A and 7. The auxiliary frame section is constructed to be connected to the rear frame section in the same manner as described above for the front frame section. The auxiliary frame section 50 similarly comprises a pair of longitudinally extending leg members 51 and 52 having ends 53 on which are mounted U-shaped pivot cups 54 similar to the pivot cups 33 described above. The front of the auxiliary frame section is formed by a transverse member 55 which is identical to the cross member 30 of the front frame section. The front cross member 55 similarly comprises a channel member opening upwardly and provided with a plurality of notches 56 in a flange member and with a plurality of cylindrical protuberances 57 extending upwardly from the web of the channel member.

Positioned forwardly and above the front frame member 55 is an axle beam 58 which is attached to the front member 55 by a pair of curved arms 59. On the ends of the axle beam 58 are head tubes 60 within which are pivotally supported wheels 61 which are constructed similar to castor wheels. An arm 62 extends rearwardly from the frame of each castor and these arms are pivotally connected by a tie rod 63. Steering of the front wheels 61 is achieved by a L-shaped tiller 64 the bottom end of which is inserted into one of the head tubes 60 to be nonrotatably engaged with a shaft connected to the wheel 61. Thus, pivoting of the tiller in either one of the head tubes 60 will cause pivoting of the respective wheel and because of the tie rod and arm connection the other wheel will correspondingly pivot to provide steering.

A forwardly extending frame member 65 is provided and on it's lower end is attached a foot plate 66. Thus, the feet of the seated user are located forwardly of the steerable front wheels which greatly increases the maneuverability of the vehicle.

When the user of the personal vehicle desires mobility in limited or confined spaces, he has the option of attaching the auxiliary frame section 50 to the powered rear frame section 13. The attachment of the auxiliary frame section to the rear frame section is achieved in the same manner as described above for connection of the front and rear frame sections. The rear frame section 13 is stood up on its rear and the auxiliary frame section 50 is moved longitudinally until the pivot pins 44 on the rear frame section are pivotally received within the pivot cups 54. The rear frame section is then pivoted in the pivot cups until the front member 41 is received within the channel shaped front member 55 of the auxiliary frame section. In a like manner as described above, the support arms 43 are received in the notches 56 of the front member 55 and openings 48 on the lower side of the front cross member 41 are positioned over the protuberances 57 to provide a secure and rigid connection of the auxiliary frame section to the rear frame section.

Since it is generally intended that the auxiliary frame section is used indoors or for only limited mobility, it may not be necessary to use a locking pin such as 39 as described above to lock the rear frame section to the channel member 55. However, if desired this locking pin can be employed.

Figure 7:
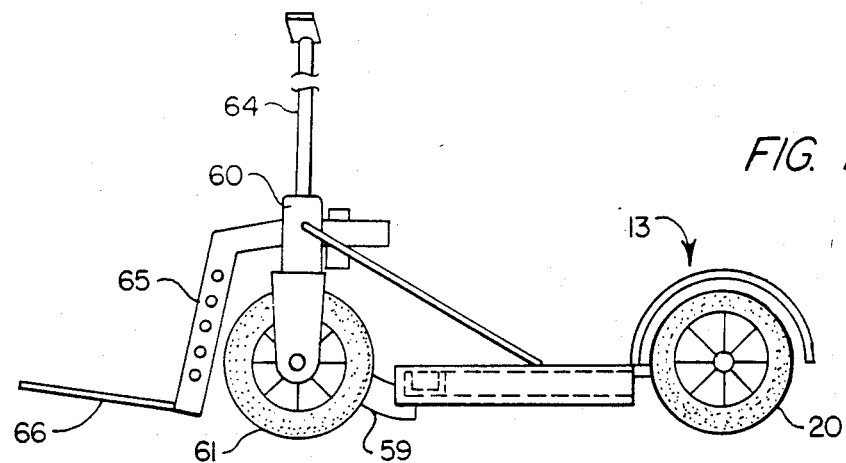
FIG. 7 is a side elevational view showing the auxiliary frame section of FIG. 6A and the rear frame section of FIG. 6B in an initial assembled position with the drive wheels being removed for purposes of clarity.

The increased maneuverability of the four wheel vehicle is readily apparent when it is considered that the wheel base of the vehicle is shortened 35%. In the disclosed embodiment of the three wheel vehicle as shown in FIG. 1, the wheel base is 29 inches, whereas the wheel base of the four wheel vehicle shown in FIG. 7 is only 18.75 inches. This reduction in wheel base length of about one-third results in a compact powered vehicle which is easily maneuverable in restricted areas. While the four wheel vehicle is generally intended for indoor use, this vehicle can also be used safely outdoors. The use of two steerable wheels on the auxiliary frame section increases the stability of the vehicle while making tight turns indoors or outdoors.

The maneuverability can be further increased by furnishing the auxiliary frame section with castor wheels which are freely pivotable about vertical axis and providing individual mechanical or electrical brakes for each of the two driving wheels on the rear or power frame section. Since the drive wheels are connected by a differential, braking of a rear wheel provides an extremely tight turn, i.e. about the braked wheel. The castors then act as slaves and respond to the turning about a braked rear wheel.

As a further modification, the seat on the power unit can be reversed so that the drive wheels now act as the front wheels for the vehicle. The auxiliary frame section then functions as the rear frame section and is provided with one or two castors or steerable wheels. If castors are used, the drive wheels can be braked as described above to provide steering. If steerable wheels are used on the auxiliary frame section, then a tiller arrangement can be provided for steering.

The maneuverability of the three wheel vehicle can be greatly increased by providing a retractable wheel or wheels on the power unit immediately in front of the seat. This wheel is retracted or extended by a worm or ratchet drive. To obtain maneuverability without converting the three wheel vehicle into a four wheel vehicle as described above, the retractable wheel is extended downwardly to a position that the front wheel 14 is raised from the ground about one inch. The wheel base is thus effectively shortened substantially on the same order as with the use of the auxiliary frame section. The retractable wheel can be steered by a tiller positioned as described above for the auxiliary frame section. Alternatively, the retractable wheel or wheels may be castors and steering achieved by selective braking of either of the two drive wheels as described. The retractable wheel or wheels are mounted on the end of a vertically adjustable rod-like member and this member is moved either upwardly to retract the wheels or downwardly to extend the wheels.

Thus it can be seen that the present invention has provided an improved personal mobility vehicle whose maneuverability can be significantly increased by shortening the wheel base on the order of 35% while still maintaining stability of the vehicle. The vehicle has a simple and reliable detachable connection between it's two frame sections and may include an auxiliary frame section for optional use with the rear frame section. At the same time, the three wheel personal mobility vehicle as shown in FIG. 1 is converted into a more compact and maneuverable four wheel personal vehicle as seen in FIGS. 7 and 8. The improved detachable connection between the two frame sections enables the vehicle to be readily converted in a matter of seconds without the use of any tools and may actually be carried out by the user without any assistance since the components of the vehicle are relatively light in weight and are shaped to be easily handled.

A further advantage is that the four wheel vehicle of the present invention enables the seated user to have front access to work stations, desks, tables, sinks, toilets and like structures as compared to the occupant of the three wheel vehicle who is limited to side or lateral access. In a three wheel vehicle, the user must stop the vehicle in a position in which the structure is laterally of or alongside the vehicle and a side of the vehicle faces the structure, unlock the seat, remove his legs from the floor pan and pivot the seat 90 degrees while swinging his body across the front of the vehicle so that the user faces toward the structure with his legs dangling over the side of the vehicle with no support for his feet. The occupant of a four wheel vehicle thus eliminates the necessity of pivoting his seat and the actions attendant thereto as described above and may approach frontally or head-on the foregoing and like structures for facilitated access to the structures.

The facility of this assembly of the vehicle means that the vehicle can be readily transported in an automobile or other form of motor vehicle to a desired destination and then can be assembled in seconds into either a three wheel or four wheel configuration at the option of the user.

It will be understood that this invention is susceptible to modification in order to adapt it to different usages and conditions, and accordingly, it is desired to comprehend such modifications within this invention as may fall within the scope of the appended claims.

What is claimed is:

1. A personal vehicle comprising a front frame section having a rear portion and a steerable front wheel forwardly of said rear portion, a rear frame section having drive wheels and a power source drivingly connected to said drive wheels, means on said rear portion of said front frame section and on said rear frame section for detachably connecting said rear frame section within said rear portion of said front frame section, an auxiliary frame section having at least one steerable wheel and having a length less than that of said front frame section, and means on said auxiliary frame section for detachably connecting said auxiliary frame section to said rear frame section after said front frame section has been detached therefrom such that one of said auxiliary frame section and said front frame section can be connected selectively to said rear frame section.

2. A personal vehicle as claimed in claim 1 wherein said auxiliary frame section has a rear end and said detachable connecting means are on said rear end.

3. A personal vehicle as claimed in claim 1 wherein said detachable means on each of said front frame section and said auxiliary frame section are identical.

4. A personal vehicle as claimed in claim 1 wherein said detachable connecting means comprises means for pivoting said rear frame section on the rear portion of one of said front frame section and said auxiliary frame section and for locking said rear frame section within the rear portion of one of said front frame section and said auxiliary frame section.

5. A personal vehicle as claimed in claim 1 where said auxiliary frame section has a rear portion, each of said front frame section and said auxiliary frame section comprising a pair of spaced longitudinal frame members extending rearwardly and having rear ends, a first cross member inwardly of the rear ends of each said pair of frame members to define a said rear portion.

6. A personal vehicle as claimed in claim 5 wherein said detachable connecting means comprises a pivot connection between said rear ends of said frame members and said rear frame section.

7. A personal vehicle as claimed in claim 5 and further comprising means on said first cross member for positioning said rear frame section in connected relation with said rear portion of one of said front frame section and said auxiliary frame section.

8. A personal vehicle as claimed in claim 7 and further comprising means for locking the positioned rear frame section in connected relation with one of said front frame section and said auxiliary frame section.

9. A personal vehicle as claimed in claim 5 and further comprising a substantially U-shaped pivot cup on each of said rear ends of said frame members and opening rearwardly of said front frame section and auxiliary frame section respectively, and a pair of transverse pivot pins at the rear of said rear frame section and pivotally received within said pivot cup.

10. A personal vehicle as claimed in claim 9 wherein said rear frame section comprises a second cross member at its rear and said pivot pins extend outwardly from the ends of said second cross member.

11. A personal vehicle as claimed in claim 10 wherein said rear frame section comprises a third cross member defining a forward edge thereof, and means for locking said third cross member to said first cross member when said rear frame section and one of said front frame section and said auxiliary frame section are in connected relation.

12. A personal vehicle as claimed in claim 11 wherein said first cross member has a channel shape which opens upwardly to receive said third cross member of said rear frame section.

13. A personal vehicle as claimed in claim 12 wherein said rear frame section comprises a second cross member at its rear and said pivot pins extend outwardly from the sides of said second cross member, said rear frame section further comprising a plurality of center support members extending longitudinally between said second and third cross members, there being a plurality of notches in a flange of said channel shape first cross member corresponding to the plurality of said center support members and receiving said center support members when said rear frame section and one of said front frame section and auxiliary frame section are in connected relation.

14. A personal vehicle as claimed in claim 13 wherein there is a plurality of upstanding protuberances in the web of said channel shape first cross member, said forward third cross member of said rear frame section having an underside with a corresponding plurality of openings therein to register with said protuberances so as to position said rear frame section with respect to one of said front frame section and said auxiliary frame section.

15. A personal vehicle as claimed in claim 14 and further comprising means for locking said rear frame section in position on said first cross member of one of said front frame section and said auxiliary frame section.

16. A personal vehicle as claimed in claim 1 wherein said front frame section has a forward portion and said steerable wheel is mounted on said forward portion.

17. A personal vehicle comprising a power frame section having drive wheels and a power source drivingly connected to said drive wheels, a control frame section having a steerable wheel and means thereon for steering said wheel, an auxiliary frame section having at least one steerable wheel and a length less than that of said control frame section, and coacting means on said power frame section and on each of said control frame section and said auxiliary frame section for detachably and selectively connecting one of said control frame section and said auxiliary frame section to said power frame section.

18. A personal vehicle as claimed in claim 17 wherein said power frame section has a pair of driving wheels, said control frame section has a single steerable wheel and said auxiliary frame section has a pair of steerable wheels whereby connecting of said auxiliary frame section to said power frame section when said control frame section has been separated therefrom converts the personal vehicle from a three to a four wheel vehicle.

19. A personal vehicle comprising a power frame section having drive wheels and a power source drivingly connected to said drive wheels, a control frame section having a steerable wheel and means on said control frame section for steering said wheel, frame section means having at least one steerable wheel and connectable to said power frame section after said control frame section has been disconnected therefrom for decreasing the length of the wheel base of the vehicle such that the maneuverability of the vehicle is increased.

20. A personal vehicle as claimed in claim 19 wherein the length of the wheel base is decreased on the order of about 35%.

21. A personal vehicle as claimed in claim 19 wherein said frame section means has a pair of steerable wheels.

22. A personal vehicle as claimed in claim 19 wherein said frame section means has a pair of castor wheels, and means on said power frame section for selectively braking a drive wheel to steer the vehicle.

23. A personal vehicle as claimed in claim 22 and further comprising a seat unit on said power frame section and positionable to face one of toward and away from said castor wheels.

* * * * *